United States Patent
Beardsley et al.

(10) Patent No.: US 6,345,295 B1
(45) Date of Patent: Feb. 5, 2002

(54) CONDUCTING TRACES IN A COMPUTER SYSTEM ATTACHMENT NETWORK

(75) Inventors: Brent Cameron Beardsley; Carl Evan Jones; William Griswold Sherman; Joe Edward Smothers, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/235,303

(22) Filed: Jan. 22, 1999

(51) Int. Cl.[7] .............................. G06F 13/38; G06F 9/45; H02H 3/05
(52) U.S. Cl. ...................... 709/224; 709/223; 709/106; 709/227; 714/38; 714/45; 714/35; 717/4
(58) Field of Search ................................. 709/224, 223, 709/107, 106, 314; 714/38, 45, 39, 4, 1, 47, 35; 717/4

(56) References Cited

U.S. PATENT DOCUMENTS

| | | | |
|---|---|---|---|
| 5,355,487 A | | 10/1994 | Keller et al. .................. 395/650 |
| 5,379,427 A | | 1/1995 | Hiroshima ..................... 395/650 |
| 5,737,520 A | | 4/1998 | Gronlund et al. ........... 395/183.15 |
| 5,751,942 A | | 5/1998 | Christensen et al. ...... 395/183.14 |
| 5,802,272 A | * | 9/1998 | Sites et al. ...................... 714/45 |
| 5,887,167 A | * | 3/1999 | Sutton ......................... 709/314 |
| 5,920,719 A | * | 7/1999 | Sutton et al. ................... 717/4 |
| 5,931,912 A | * | 8/1999 | Wu et al. ..................... 709/224 |
| 5,996,092 A | * | 11/1999 | Augsburg et al. .............. 714/38 |
| 6,157,940 A | * | 12/2000 | Marullo et al. .............. 709/224 |
| 6,223,306 B1 | * | 4/2001 | Siva et al. ..................... 714/37 |
| 6,226,270 B1 | * | 5/2001 | Chiku et al. ................. 370/248 |
| 6,230,313 B1 | * | 5/2001 | Callahan, II et al. ........... 717/4 |
| 6,243,836 B1 | * | 6/2001 | Whalen ........................ 714/45 |
| 6,247,146 B1 | * | 6/2001 | Wheatley et al. .............. 714/38 |

* cited by examiner

Primary Examiner—Dung C. Dinh
Assistant Examiner—Abdullahi E. Salad
(74) Attorney, Agent, or Firm—John H. Holcombe

(57) ABSTRACT

A trace facility for a computer system attachment network, a method for operating that network, and trace tools in the network. The network has a plurality of the trace tools, each connected to a communication path, the trace facility providing a system wide trace. The trace facility comprises at least one trace buffer at each trace tool. Each trace tool has an address filter selecting an address range of information on the bus, the information being communicated on the bus as events, and storing the selected event information in the trace buffers, thereby conducting a trace. A breakpoint connection is provided interconnecting each of the trace tools. A trace tool control at each trace tool responds to a trace stop command addressed to the trace tool, to stop the trace at its address filter and trace buffer, and to issue a breakpoint signal on the breakpoint connection to all the interconnected trace tools. The interconnected trace tools respond to the breakpoint signal to stop the trace thereat, so that the trace is saved at each trace tool. An elapse clock provides a time stamp for each traced event to allow determination of the timing of each event.

21 Claims, 3 Drawing Sheets

CONDUCTING TRACES IN A COMPUTER SYSTEM ATTACHMENT NETWORK

TECHNICAL FIELD

This invention relates to conducting traces of events in a computer system attachment network, and more particularly, to traces conducted involving events at a plurality of intelligent interface adapters.

BACKGROUND OF THE INVENTION

Tracing of events, or the determination of the state of interfaces or devices during an event, such as sending or receiving data, can be helpful in determining the cause of an error in the communication process. The typical tracing apparatus deals with a single device and traces an event or a series of events with respect to that device. For example, U.S. Pat. No. 5,379,427, Hiroshima, describes a task tracing apparatus for a single multitasking operating system, which stores causes and addresses of interruptions, and stores system call numbers and addresses of system calls issued by an ongoing task. Co-assigned U.S. Pat. No. 5,355,487, Keller, et al., describes a single non-invasive trace facility which profiles a single operating system, employing a timer interrupt to capture addresses of routines and correlates them back to specific instructions and to specific lines of source code to determine the amount of time that the processor spent on various activities.

In an environment of a plurality of communication paths connecting one or more hosts separately to different devices or external communication paths, a problem on one communication path may cause an erroneous message to be sent on another communication path which in turn can cause problems at the connected devices. Further, bottlenecks may occur in the use of the plurality of communication paths such that the efficiency of the communications may be improved. With the standard tracing tools, such as discussed above, a trace device is connected at one communication path, and then moved to another communication path and the event duplicated. Thus, when a problem occurs or a possible bottleneck is analyzed, many different, asynchronous traces must be analyzed separately. As the result, great deal of time is spent attempting to determine the sequence of the events at the various communication paths. It requires that the system debugger understand many aspects of the system and be able to analyze and determine the state of the network at the time that the problem was discovered by looking into the traces of all the individual communication paths.

SUMMARY OF THE INVENTION

An object of the present invention is to provide a trace facility for monitoring an entire computer system attachment network.

Disclosed is a trace facility which is in place on a continuing basis for a computer system attachment network, a method for operating the trace facility, and the trace tools in the network. The network has a plurality of communication paths on which information is communicated as events, the trace facility providing a system wide trace in response to a "trace run" command at desired trace tools followed by a "trace stop" command. The trace facility comprises a trace tool at each communication path at which events are to be traced. Information communicated on the communication path as events has addressing information in a header, and each trace tool has an address filter coupled to the associated communication path for detecting the addressing information. The address filter selects information from the communication path for each event having at least one selected address. The selected event information is stored in a trace buffer as a series of trace entries. A time sequenced collection of trace entries is a trace. A breakpoint connection is provided at each of the trace tools, interconnecting each of the trace tools. A trace tool control at each trace tool responds to "trace run" and "trace stop" commands. After being placed in a "trace running" state by a command, and tracing a series of events, a trace stop command may be provided to one of the trace tools, and the addressed trace tool stops the trace at its address filter and trace buffer, and issues a breakpoint signal on the breakpoint connection to all the interconnected trace tools. In one embodiment of the invention, the issuance and/or receipt of the breakpoint is also selectable. The trace tool control of each of the interconnected trace tools responds to the provided breakpoint signal to stop the trace at the address filter and the trace buffer thereat, so that the traces are saved in the trace buffer at each trace tool.

In another aspect of the present invention, the trace buffer of each trace tool comprises a memory which is programmable by the trace tool control into one or more wrapping trace buffers of variable length, and wherein the trace tool address filter stores the selected event information as a trace entry in an associated programmed wrapping trace buffer, so that newer selected event information overwrites the oldest selected event information. Additionally the address filter selects the maximum extent of the selected event information for each event. In one embodiment, the extent may be controlled by the size of a data count field.

In still another aspect of the present invention, subsequent to a trace stop command, a trace data request is provided addressing at least one of the trace tools. The addressed trace tool makes the trace information from each trace buffer available to the communication path.

In a further aspect of the present invention, each trace tool of the trace facility additionally comprises an elapse clock. Each trace is time stamped with the elapse clock timing, in one embodiment, from the previous trace, and the time stamp is stored in the trace buffer. Additionally, the trace tool control responds to a trace stop command and to a received breakpoint signal to mark a time stamp for the received trace stop command/breakpoint signal. Thus, the timing of each of the traces is determinable from the sequence of the time stamps.

In a still further aspect of the invention, wherein the computer system attachment network comprises a plurality of communication paths with a plurality of host computers, with at least one associated communication path of each host connected to a trace tool. After being placed in a "trace running" state by a command, a trace stop command may be provided to one of the trace tools, and the addressed trace tool stops the trace at its address filter and trace buffer, and provides a breakpoint signal on the breakpoint connection to all the interconnected trace tools, including those coupled to other hosts.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
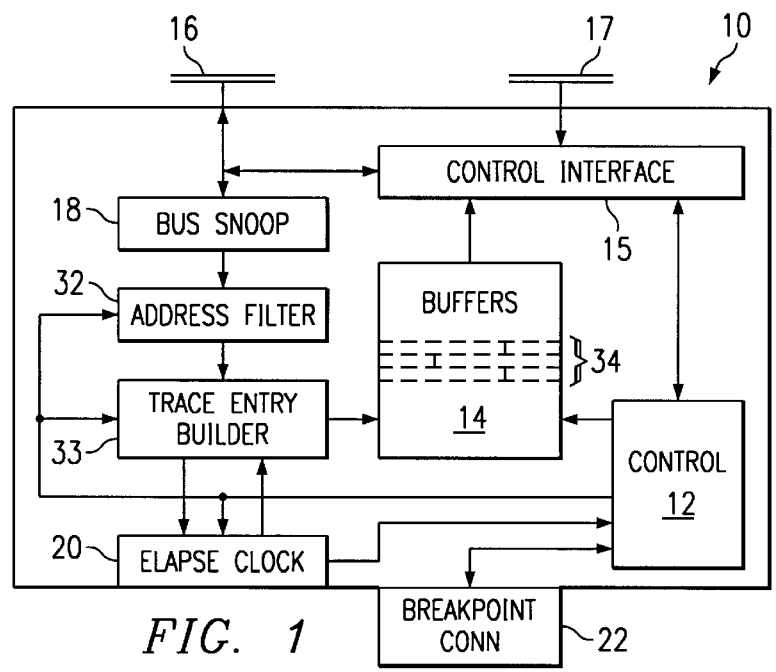
FIG. 1 is a block diagram representation of an embodiment of a trace tool in accordance with the present invention.
Figure 2:
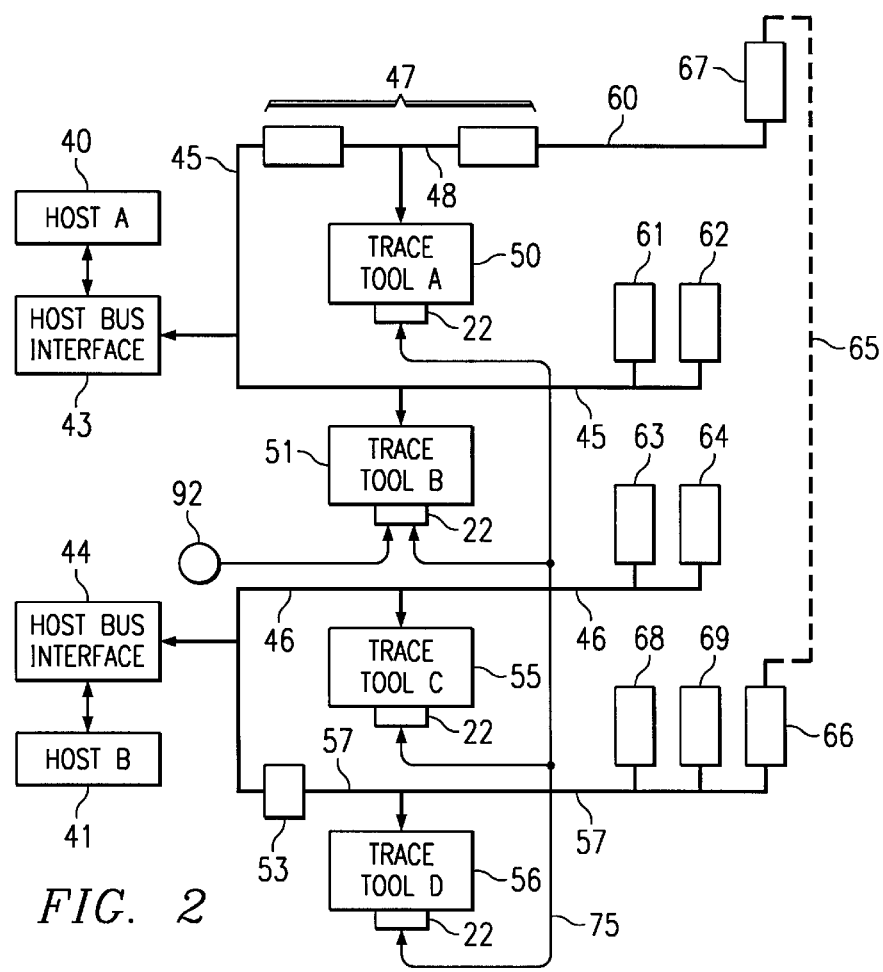
FIG. 2 is a block diagram representation of an embodiment of a trace facility for a computer system attachment network employing a plurality of the trace tools of FIG. 1.
Figure 3:
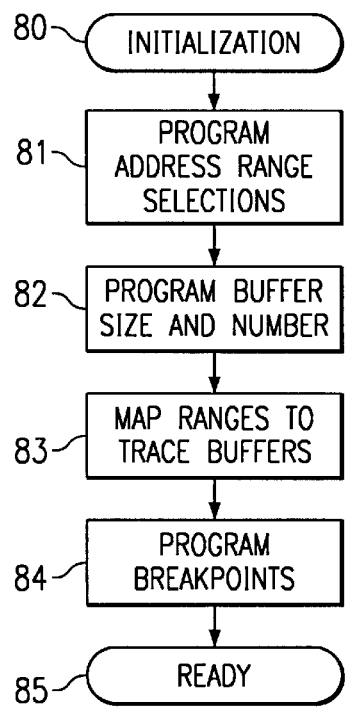
FIGS. 3, 4, 5 and 6 are flow charts depicting an embodiment of the method of the present invention.

Referring to FIGS. 1 and 2, an embodiment of a trace facility for a computer system attachment network in accordance with the present invention is illustrated in FIG. 2 employing a plurality of the trace tools 10 of FIG. 1. The trace tools 10 are a permanent part of the computer system attachment network of FIG. 2 to form the trace facility.

A trace tool 10 may comprise logic which is operated by a trace tool control 12, and a memory 14. The logic may be hardwired, such as an ASIC, or may, for convenience, be programmable, such as a programmable logic array, and may be arranged into a plurality of logical entities. The logic may form part of a larger logic entity, such as a bus agent, for example, a PCI adapter, or a bus bridge, for example, a PCI to PCI bridge.

The controls of the trace logic may be configured by means of a control interface 15. The control interface 15 may be coupled to a bus or other communication path 16 at which the programming is delivered. Additionally, a "trace run" command to begin operation of the tracing and a "trace stop" command to halt the trace are supplied to the control interface 15 at bus 16. Alternatively, a special separate command and control bus 17 may provided for the trace tool connecting directly to the control interface 15. The trace tool 10 also includes a bus snoop 18 which reads all the information on the bus 16, without altering the information in any way. The bus snoop provides the sensed information to an address filter 32 and a trace entry builder 33.

In accordance with the present invention, the trace tool 10 is additionally provided with an elapse clock 20 and a breakpoint connection 22. The elapse clock 20 provides a continuing clock count, for example, of 32 bits, or 4 bytes, representing 4 billion ticks of the clock. The elapse clock is preferably operated at a rate related to the clock rate of the bus or communication path 16. The count of the elapse clock 20 is employed as a time stamp, as will be discussed.

The breakpoint connection 22 is an input/output for either receiving a breakpoint signal or providing a breakpoint signal, as will be discussed.

The trace tool control 12, in accordance with the present invention, is configured at control interface 15 to partition the memory 14 into one or more trace buffers 34 of variable length. The trace buffers are arranged to comprise wrapping buffers wherein newer information stored in a buffer overwrites the oldest information in the buffer.

As is typical, information placed on the bus 16 is in the form of events, and, typically, has addressing information in a header. For example, a host may supply a command for a particular device, such as an intelligent interface adapter attaching an external I/O system or device, and will supply the bus address of the adapter or attached system or device in the header. Then, any supporting information is supplied as part of the transaction or event on bus 16. Upon receipt of the command, the particular device may send status information back, the status information may address the host, or may indicate the address of the particular device, so that the host may determine the status of the device.

Typically, the address information is in a range of addresses reserved for the memory of the particular device or its attachments, called "mailboxes". Specifically, devices on the bus or communication path may communicate with each other with mailboxes. The mailboxes are put into a data structure called a "post office". Each mailbox has a start address and a range, and an array of mailboxes is a "post office". Thus, the post office is a multiple times the size of a mailbox range. As the result, each device may have more than one set of address ranges, comprising more than one mailbox, for example, for the adapter and for the attached external I/O.

The trace tool address filter 32 is arranged to recognize the addresses that map to these structures.

The address filter 32 is arranged to detect the information for each event supplied by the bus snoop 18 and to select event information having selected addresses in the header. Thus, if 4 devices are coupled to the communication path 16, then the address ranges of the mailboxes for the 4 devices and/or their attachments may programmed into the address filter. The address filter 32 will look for those addresses of information on the communication path from the snoop 18 in order to select and conduct traces for information which addresses any of the 4 devices. Alternatively, the user may wish to examine less than all of the devices, or if a number of the devices have contiguous address ranges, the user may program the trace tool control 12 to operate the address filter 32 to select fewer address ranges.

As discussed above, in accordance with the present invention, the trace buffers 34 are of variable length. Thus, ones of the buffers may be programmed to be larger and the trace may be "deeper", storing a larger amount of information. For example, each trace buffer must be sufficiently large to store many transactions or events for a single mailbox address, giving the trace a greater "depth" for analysis of the chain of events.

The trace buffers need not be arranged one for one with each particular mailbox address range. Rather, it may be desirable to store traces for a related set of address ranges (for an adapter and its attached devices or system) in the same trace buffer.

Additionally, in configuring the trace tool, when it is known that only a particular device is to be traced where much of the information can be implied, the extent of the information that is selected for each event may be programmed to be very small. The trace tool address filter, including the trace entry builder 33, includes a counter for establishing the data length count of each event that is stored, and stores the count with each event. Thus, in one embodiment, the maximum count of the counter limits and, by configuring the counter limits, the extent of the selected information for each said event may be controlled. In effect, the address filter 32 is programmed to select different extents of the data. An example of a device for which much of the information can be implied is a predefined storage device.

In a preferred embodiment, the trace buffers are made sufficiently long to hold a large number of "mailbox messages". The trace entries include the address, data, entry size (count), and time stamp of each bus event. It takes one or more of the bus transactions or events to constitute a mailbox message. The content of the mailbox messages varies with the application, but it can be considered as control and/or status information passed from one processor to another or from a processor to memory. In the case of many devices, the controller of the device is typically a processor. Typically, a mailbox message of a plurality of events will use the next address in the range of the mailbox of the receiving device for each sequential event.

Thus, each trace buffer 34 is programmable or configurable in that it has a variable size and the address filter 32 is programmed or configured to supply event information having various address ranges and extents.

The selected information from the address filter is assembled by the trace entry builder 33, and time stamped with the count of elapse clock 20. When a trace entry is stored in buffer 34, the elapse clock is zeroed and the trace entry is therefore the elapsed time since the trace entry for the previous event.

A trace entry consists of:
1) The address on the bus for the bus event;
2) The data of the bus event;
3) The amount of data in the trace entry (the data length count); and
4) The elapsed time since the previous trace entry.

The resultant trace entry is then stored in the selected trace buffer 34.

FIG. 2 illustrates an embodiment of a trace facility for a computer system attachment network for host computers 40 and 41 in accordance with the present invention. The network employs a plurality of the trace tools 10 of FIG. 1. An example of a host computer is a workstation, such as an IBM RS/6000 model F50.

The host computers 40 and 41 each communicates via a host bus interface 43 or 44 with an associated communication path 45 or 46. The host bus interfaces may, for example, comprise IBM 27-82654 PCI/Memory Controllers, which bridge each processor bus to the respective communication paths 45 and 46.

In the illustrated example, communication path 45 comprises a bus and a communication path transmission device 47, such as a bus to bus bridge coupled to a second communication path 60. For example, such a bus to bus bridge may be a PCI to PCI bridge. The communication path transmission device 47 is arranged to receive inputs at one bus, convert the inputs to the format of the other bus, and provides the converted inputs to the other bus. The communication path transmission device 47 has an internal bus 48, and a trace tool 50 is illustrated as coupled to the internal bus. Thus, trace tool will only receive and be able to snoop that information put on the bus 48 by the transmission device, and will be unable to snoop information on the busses forming communication paths 45 and 60 outside the transmission device.

In one embodiment of the present invention, the trace tool 50 is incorporated in the communication path transmission device 47, for example comprising a portion of the logic and memory of the transmission device.

Another trace tool 51 is illustrated as coupled to the communication path 45, and is able to snoop, but is not necessarily configured to select, all of the event information appearing on the bus of the communication path 45.

Communication path 46 is illustrated as incorporating a communication path transmission device 53 which, for example, comprises a bridge extender which is limited in capability compared to the communication path transmission device 47.

A trace tool 55 is coupled to the communication path or bus 46, and, as above, is able to snoop, but is not necessarily programmed to select, all of the information appearing on the communication path or bus 46.

Another trace tool 56 is coupled to the extended bus 57.

Thus, in the embodiment of FIG. 2, the trace tool 51 is coupled to the communication path 45 and thereby to host 40, and host 41 and communication path 46 are coupled to trace tool 55. Each of the trace tools 50, 51, 55 and 56 is a trace tool 10 of FIG. 1.

The communication path 45 is coupled, for example, to device or communication adapters or controllers 61 and 62, and communication path 46 is coupled to, for example, to device or communication adapters or controllers 63 and 64. The device or communication adapters or controllers may, for example, comprise external I/O adapters at which peripheral devices are coupled, such as peripheral data storage or communications devices.

In one embodiment, the hosts 40 and 41 are arranged in a network. Extended busses 57 and 60 may be directly coupled, via bridges, to one another, or, as illustrated in FIG. 2, are respectively coupled to a LAN 65 by I/O adapters 66 and 67. Additionally, bus 57 is coupled to device or communication adapters or controllers 68–69.

In accordance with the present invention, each breakpoint connection 22 for the trace tools 50, 51, 55 and 56 is coupled to each other breakpoint connection over coupling 75. Thus, the breakpoint connections are input/outputs over which one trace tool may provide a breakpoint signal to all other trace tools at their breakpoint connections 22.

Referring additionally to FIGS. 3–6, the operation of the trace facility for a computer system attachment network of FIG. 2 will be discussed. First, before any tracing can be conducted, the trace tool must be configured at initialization step 80 of FIG. 3. The programming or configuration of one or more of the trace tools 50, 51, 55 and 56, begins with step 81. The trace ranges of the address filter 32 of each of the trace tools is initialized by its control interface 15 in step 81. As discussed above, the extent of data for each event to be supplied to the buffers may also be configured by initializing the length of the count field. In step 82, the trace buffers 34 are configured to desired size and number by the control interface. Step 83 maps the selected address ranges to specific trace buffers 34.

Thus, if the bus 57 were fully occupied, then the address ranges of the mailboxes for the adapters or devices 66, 68 and 69 may be programmed into the address filter for the trace tool 56, and the trace buffers 34 are configured to desired lengths. The trace tools may also serve as trace filters by omitting an address range in the programming step 81.

The breakpoints are initialized in step 84. Thus, if the user of the trace facility only wanted to trace bus 48, the trace tool 50 would be programmed to not issue breakpoints. If the user of the trace facility wanted to trace busses 45, 46 and 47 separately from bus 48, the trace tool 50 would be programmed to not receive (or not respond to) breakpoint signals from the other trace tools. Trace tools 51, 55 and 56 would be programmed to both issue breakpoint signals and to receive breakpoint signals at their respective breakpoint connections 22.

At this point, step 85, the initialization of the trace tools is complete. The user of the trace tool facility may then, in step 90 of FIG. 4, issue the "trace run" command for desired ones of the trace tools.

Figure 4:
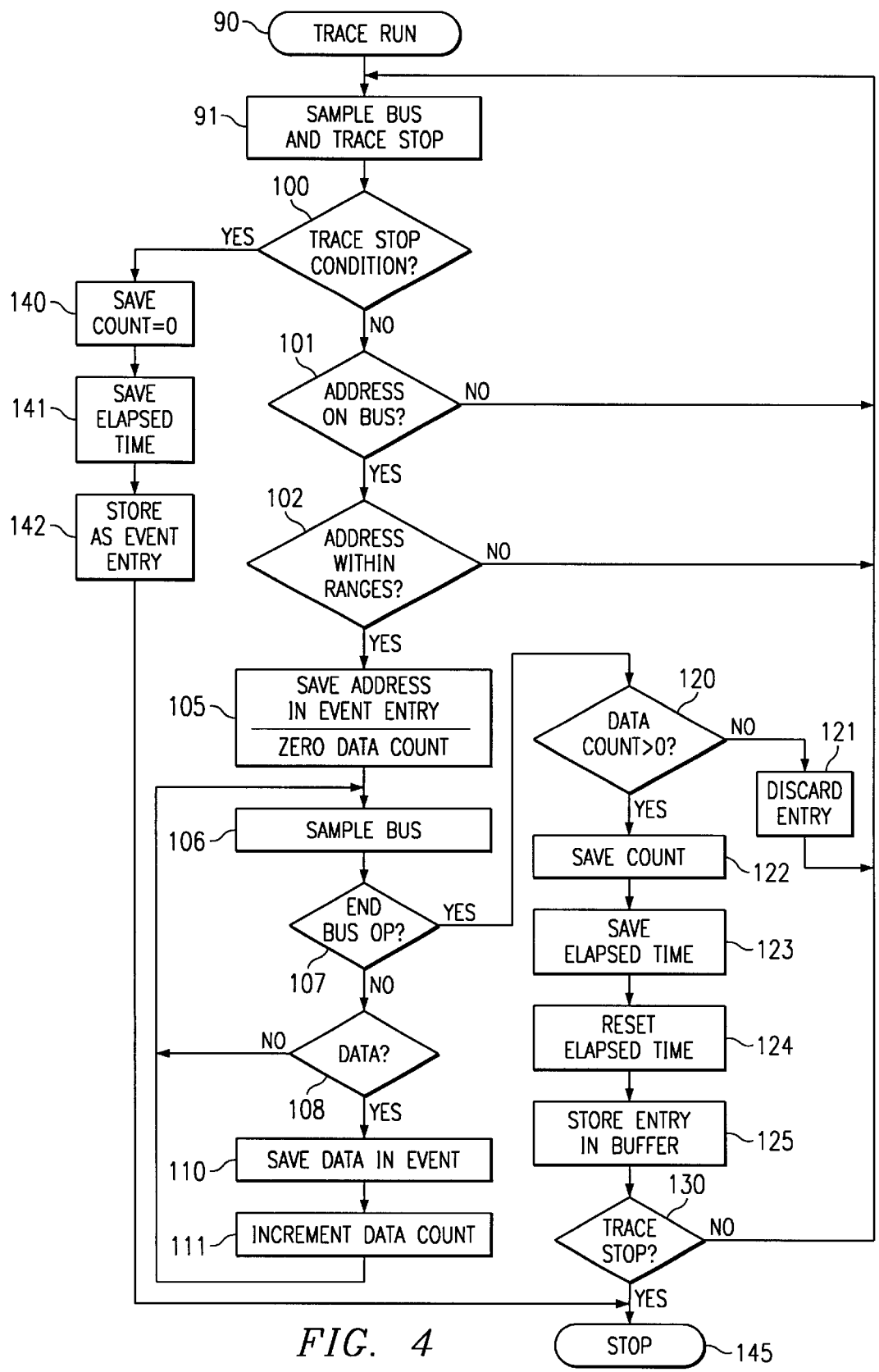

Referring to FIG. 4, the operation is described on a cycle by cycle basis. Much of the time, no information is present on the busses. The event information on the a typically comprises messages which may comprise one or more events, separated by pauses. The typical bus has a predetermined clock rate, and the elapse clock is arranged to operate at the clock rate of the bus.

Specifically, the method illustrated by FIG. 4 is directed at a single trace tool. Thus, the method is performed in parallel at each of the trace tools receiving a "trace run" command.

In step 91, the information on the communication path of a trace tool is snooped by bus snoop 18, and the trace tool address filter 32 of trace tools 50 and 51 will sample and detect the programmed address ranges of information, respectively on internal bus 48 and on the bus of communication path 45, and the address filter 32 of trace tools 55 and 56 will sample and detect the programmed address ranges of information, respectively on the bus of communication path 46 and on extended bus 57.

Step 91 also samples the trace stop inputs every cycle when the trace is running. This is so that the trace tool will be assured of responding to the "trace stop" command and to the received breakpoint signal, as depicted in FIG. 5.

Figure 5:
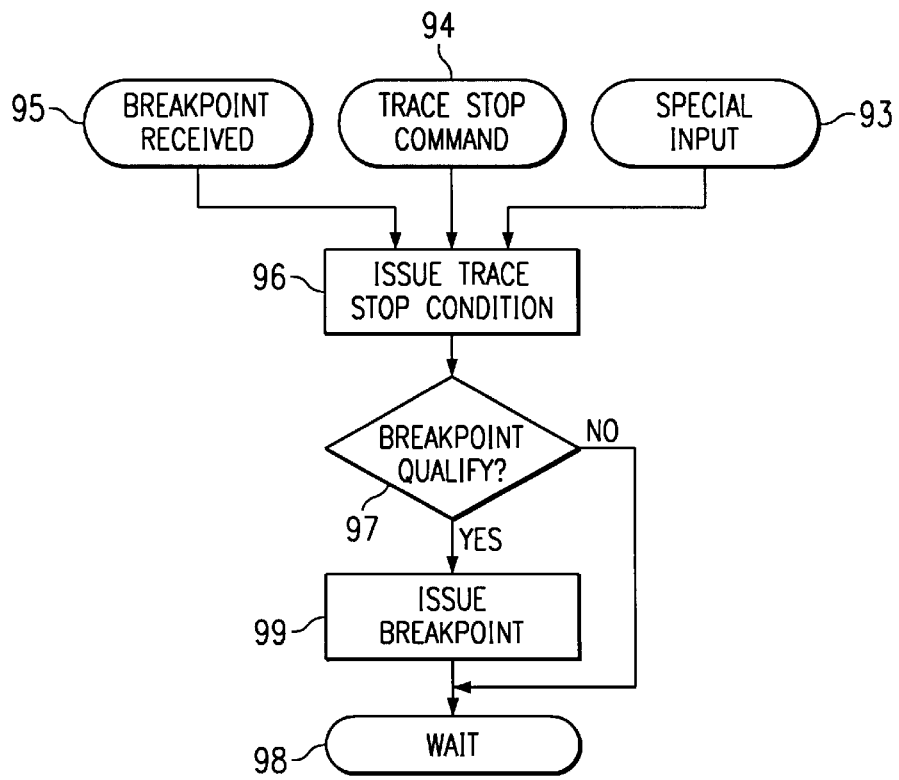

Referring to FIGS. 2 and 5, an input 92 to breakpoint connection 22 of trace tool 51 (or to all trace tools) may be provided for a special input signal 93. Referring additionally to FIG. 1, a "trace stop" command 94 to halt the trace may be supplied to the control interface 15 at bus 16, or at a special separate command and control bus 17 connecting directly to the control interface 15. Lastly, a breakpoint signal 95 may be received at breakpoint connection 22 of the trace tool. The inputs 93 and 95 are forwarded to the trace tool control 12 from the breakpoint connection 22 and the control interface 15 forwards the trace stop command 94 to the trace tool control.

In response, the trace tool control 12, in step 96, the trace tool issues a trace stop condition for the trace tool, and, in step 97, determines whether the breakpoint is qualified as the result of the input 93, 94 or 95. If the trace stop condition is the result of an input breakpoint signal 95, no new breakpoint signal will be issued. The initialization configuration discussed above will determine whether the special input 93 or the trace stop command 94 will trigger a breakpoint signal. If no breakpoint signal is to be issued, "NO", the trace tool control goes to a "WAIT" state 98, which is discussed with respect to FIG. 4. If a breakpoint signal is to be issued, "YES", the trace tool control causes the breakpoint signal to be issued at the breakpoint connection 22 in step 99, and the trace tool control goes to the "WAIT" state 98.

Additionally referring to FIG. 2, the step 99 breakpoint signal is transmitted by coupling 75 to all other trace tools. Optionally, the breakpoint connection and coupling 75 may have a separate connection to each separate trace tool. Thus, the trace tool may be programmed to supply the breakpoint signal to specific ones of the other trace tools, based on the received trace stop command.

At the other trace tools, in step 95, the breakpoint signal sent by the originating trace tool in step 99 is received. In response, step 96 determines that a breakpoint has been received, and issues its trace stop condition.

Referring to FIGS. 1 and 4, step 100 determines whether the trace stop condition of step 96 has been issued. If "NO", the trace is still running.

In step 101, the address filter 32 for the trace tool detects the address of the event information on the bus, and, in step 102, selects the specific information having a start address in an address range for which the address filter is programmed. The selection is in order to select and conduct traces for information which addresses any of the devices for which it is programmed. If, in step 101, the information contains no address, or, in step 102, the detected address is not within an address range for which the address filter is programmed, the method is taken back to step 91 for the next bus cycle.

In step 105, the trace entry builder 33 begins to build the trace event which captures and saves the address and the event information in the event entry. In the normal course, if the address matches a range, then all the data in the transaction or event will be assembled in the event entry, including the address. In step 105, any address information received in that cycle is placed in the event entry.

As will be recalled, the steps of FIG. 4 are conducted on a cycle basis, thus, the trace entry builder 33 conducts step 105 until all bytes of the address have been built into the trace event entry.

Also in step 105, the data counter of the trace event builder 33, which counts each of the bytes of data of the trace event entry, is set to zero. As discussed above, the length of the selected event information entry is determined by the count of the data counter. Exemplary trace event entries will comprise 32 byte segments.

Then, step 106 detects the next sample of the bus, and step 107 determines whether the end of the bus operation has been received in that next sample. If not, "NO", step 108 determines whether the next sample is data. If not, "NO", the next sample is a pause on the bus, and the process cycles back to step 106 for the next sample time. If the next sample is data, "YES", the trace event builder 33, in step 110, saves the data in the event, and step 111 increments the data counter. The process then cycles back to step 106 to again sample the bus. The process continues until step 108 detects the end of the bus operation, "YES".

Step 120 detects the data counter, and if the data count is zero, "NO", the trace entry builder 33 discards the entry in step 121. The process then cycles back to step 91 to again begin sampling the bus and trace stop. If data has been detected and placed in the event entry, "YES", the trace entry builder, in step 122, saves the count. Then, in step 123, the trace entry builder operates the elapse counter 20 to provide the elapsed time and saves the elapsed time, thereby time stamps the trace event with the count of elapse clock 20. The time stamp may comprise a 32 bit (4 byte) number. Then, in step 124 the trace entry builder or the trace tool control resets the elapsed time. The event entry is now complete, as described above, and the trace entry builder 33 stores, in step 125, the selected event information in the identified trace buffer 34. As discussed above, the trace buffers are programmed to be sufficiently long to include a plurality of events, and the selected addresses have been mapped to identified trace buffers.

Step 130 determines whether the trace stop condition has been issued, e.g., whether any trace stop command, special input or breakpoint has been received by the trace tool, as discussed above. If not, "No", the process cycles back to step 91 to detect the address ranges of information and conduct traces for the next event which addresses any of the devices for which it is programmed. With respect to step 125, any new trace event information stored in a trace buffer 34 will overwrite the oldest trace event information in the associated trace buffer.

If, in step 100, a trace stop condition has been issued, "Yes", and the trace is being stopped, the trace tool control 12, in step 140 will set the data count to zero and save that special data count. The trace tool control, in step 141, operates the elapse counter 20 to provide the elapsed time and saves the elapsed time, thereby time stamps the trace stop condition with the count of elapse clock 20. In step 142, the trace tool control causes the trace entry builder to store the count of zero and the time stamp as an event entry. Thus, an identifiable trace stop entry is made which the analyst may use to determine the timings of the event entries of the trace buffers 34 for the trace tool. Specifically, the precise timing of each of the traces may thus be determined from the elapsed times of each of the event entries and that of the trace stop. The trace stop timing is known to the analyzer of the traces since all of the trace tools have been stopped at the same time by means of the breakpoint signal.

The traces are then stopped in step 145, so that the entries will not be overwritten and are saved for analysis.

Should steps 101–125 be in process, the current entry is completed, and, only after the last entry is stored in step 125, is the trace stopped as the result of detection of the trace stop condition in step 130. The entry of step 142 is stored only after step 125 stores the last event entry.

The trace will remain stopped until it is restarted in step 90.

Figure 6:
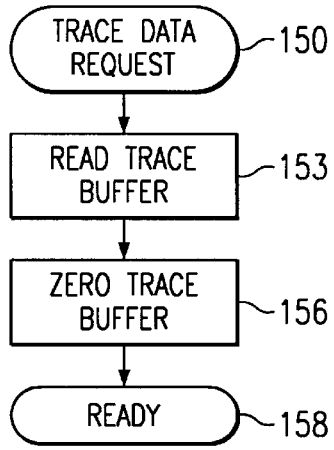

Referring to FIGS. 1 and 6, at a subsequent time, a request for the trace data will be received at step 150, identifying the trace tool. The trace data request may be received by the trace tool at bus 16 or directly at bus 17 and will be supplied by the control interface 15 to the trace tool control 12. The trace tool control 12, in step 153, gates the control interface 15 to allow the analyst, for example, through a host, to read the trace buffers 34 from the bus 16. The provided trace data includes the address, data, data count, and elapsed time for each event, as discussed above. The trace stop time stamp is identified by a special code, which in the present example is the data count of zero. The trace data may be collected by the host and then may be forwarded to another data processor for analysis. Each transmitted trace will be preceded by, as an example, a 4 byte trace tool address, including an identifier of each trace buffer 34.

Once the data is collected, and the trace buffer may be zeroed to remove any previous trace data in step 156, and the process is ready to be restarted in step 158.

Because of the breakpoint provided in step 99 by the originating trace tool and received by the other trace tools in step 95, together with the trace time stamps, all the transactions or events on the bus immediately preceding the time of the trace stop command of step 94 is saved in each of the trace buffers in each of the trace tools and, upon being provided in step 153 together with the stop time stamps, is available for analysis. The time stamps allow the sequence of the transactions or events to also be employed in the analysis.

Further, the programming of the trace tool address filters allows only events involving selected devices to be traced, and the programming of the buffer sizes allows the traces to be of desired depths.

Thus, a powerful trace tool is provided by the present invention.

The following is a sample of the contents of the message from one of the trace tools, covering the various trace buffers:

Time 0, From SA0 to HOSTA, New I/O request (device 3, head/cylinder 4, write, I/O identifier);

Time 1, To SA0, Proceed with write (cache write address, NVS write address, I/O identifier);

Time 3, From SA0 to NVS1, Data written to you—place in battery backed up memory (NVS write address, I/O identifier);

Time 4, From SA0 to HOSTA, Data written to cache (I/O identifier);

Time 5, From NVS1 to HOSTA, Data written to battery backed up memory (I/O identifier);

Time 6, From HOSTA to SA0, Write complete (I/O identifier).

Thus, in a computer system attachment network of FIG. 2, with a plurality of communication paths associated with a plurality of host computers, and with each associated bus connected to at least one of the trace tools, the trace tools are all interconnected so that, upon receipt of a trace stop command at one of the trace tools, the trace tool stops the trace at its address filter and trace buffer, and provides a breakpoint signal on the breakpoint connection to all the interconnected trace tools, including those on other communication paths. Subsequent to the trace stop command, a trace data request may be provided addressing at least one of the trace tools, and the trace tool control provides the trace information from each trace buffer for reading on the associated communication path for analysis.

One of skill in the art may envision suitable alternative components to the address filter 32 and trace entry builder 33, as well as alternative clocks 20, while maintaining the functions thereof.

Additionally, one of skill in the art may envision alternative steps and ordering of steps to the embodiment of the method illustrated in FIGS. 3–6.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a computer system attachment network, said network having a plurality of communication paths and communicating information on said communication paths as events, said information having addressing information in a header thereof, a trace facility, comprising:

a trace tool at each of associated ones of said communication paths, comprising at least one trace buffer and an address filter, said address filter coupled to said associated communication path, detecting said addressing information for each event, selecting information of an event on said communication path having at least one selected address, and storing said selected event information to said at least one trace buffer, thereby conducting a trace;

a breakpoint connection at each said trace tool interconnecting each said trace tool; and a trace tool control at each said trace tool, responsive to a trace stop command at said trace tool, to stop said traces at said address filter and said trace buffer, and to issue a breakpoint signal on said breakpoint connection to all said interconnected trace tools, said trace tool control of each said interconnected trace tool responsive to said provided breakpoint signal to stop said trace at said address filter and said trace buffer thereat, whereby said trace is saved at each said trace tool.

2. The trace facility of claim 1, wherein each said trace tool said trace buffer comprises a memory which is programmable into one or more wrapping trace buffers of variable length, wherein said trace tool control programs said memory into one or more wrapping trace buffers of variable length, and wherein said trace tool address filter additionally supplies said selected event information to selected ones of said programmed wrapping trace buffers, so that newer said selected event information overwrites the oldest said selected event information in each said trace buffer.

3. The trace facility of claim 2, wherein said trace tool address filter additionally selects the extent of said selected information for each said event for storing in said selected programmed wrapping trace buffer, and wherein said extent is a data length count.

4. The trace facility of claim 1, wherein said trace tool control additionally comprises a control interface for selectably causing said trace tool control to issue said breakpoint signal and to receive said breakpoint signal from other said trace tools.

5. The trace facility of claim 1, wherein a trace data request is provided addressing at least one of said trace tools, and wherein said addressed trace tool control responds to said trace data request, making said trace information from each said trace buffer of said trace tool available to said coupled communication path.

6. The trace facility of claim 1, wherein each said trace tool additionally comprises an elapse clock, wherein each said selected event information is time stamped with said elapse clock timing upon being stored in said trace buffer, and wherein said trace tool control additionally responds to said trace stop command and to said received breakpoint signal to mark a time stamp of said elapse clock timing at the time of said received trace stop command/breakpoint signal, whereby the timing of each of said traces is determinable from the sequence of said time stamps.

7. The trace facility of claim 1, wherein said computer system attachment network comprises a plurality of communication paths associated with a plurality of host computers, at least one said associated communication path of each said host coupled to one of said trace tools; wherein said trace stop command is provided on any of said associated communication paths; and wherein said trace tool control receiving said trace stop command stops the trace at its said address filter and said trace buffers, and provides a breakpoint signal on said breakpoint connection to all said interconnected trace tools.

8. The trace facility of claim 1, wherein each said trace tool controller initiates said trace in response to a received trace run command.

9. A trace tool for use in a computer system attachment network, said network having a plurality of trace tools, each coupled to a separate associated communication path, said network communicating information on said communication paths as events, said information having addressing information in a header thereof, said trace tools providing a trace facility, said trace tool comprising:

at least one trace buffer;

an address filter coupled to said associated communication path, detecting said addressing information for each event, selecting information of an event on said communication path having at least one selected address, and storing said selected event information to said at least one trace buffer, thereby conducting a trace;

a breakpoint connection for interconnecting said trace tool to other said trace tools providing said trace facility; and a trace tool control, responsive to a trace stop command at said trace tool, to stop said traces at said address filter and said trace buffer, and to issue a breakpoint signal on said breakpoint connection to all said interconnected trace tools, said trace tool control additionally responsive to a breakpoint signal provided to said breakpoint connection to stop said trace at said address filter and said trace buffer thereat, whereby said trace is saved at each said trace tool.

10. The trace tool of claim 9, wherein said trace buffer comprises a memory which is programmable into one or more wrapping trace buffers of variable length, wherein said trace tool control programs said memory into one or more wrapping trace buffers of variable length, and wherein said trace tool address filter additionally supplies said selected event information to selected ones of said programmed wrapping trace buffers, so that newer said selected event information overwrites the oldest said selected event information in each said trace buffer.

11. The trace tool of claim 10, wherein said trace tool address filter additionally selects the extent of each said selected event information for storing in said selected programmed wrapping trace buffer, and wherein said extent is a data length count.

12. The trace tool of claim 9, wherein said trace tool control additionally comprises a control interface selectably causing said trace tool control to issue said breakpoint signal and to receive said breakpoint signal from other said trace tools.

13. The trace tool of claim 9, wherein a trace data request is provided addressing at least one of said trace tools, and wherein said trace tool, upon being addressed by said trace data request, said trace tool control responds to said trace data request, making said trace information from each said trace buffer available to said coupled communication path.

14. The trace tool of claim 9, additionally comprising an elapse clock, wherein each said selected event information is time stamped with said elapse clock timing upon being stored in said trace buffer, and wherein said trace tool control additionally responds to said trace stop command and to said received breakpoint signal to mark a time stamp of said elapse clock timing at the time of said received trace stop command/breakpoint signal, whereby the timing of each of said traces is determinable from the sequence of said time stamps.

15. The trace tool of claim 9, wherein said computer system attachment network comprises at least one communication path having a communication path transmission device, said communication path transmission device having an internal bus, and wherein said trace tool is incorporated in said communication path transmission device, and said address filter selects said event information from said internal bus.

16. A method for providing a trace in a computer system attachment network, said network having a plurality of communication paths and communicating information on said communication paths as events, said information having addressing information in a header thereof, said network having a plurality of interconnected trace tools, each trace tool coupled to an associated one of said communication paths, said method comprising:

detecting said addressing information for each event at each said coupled trace tool from said associated communication path;

selecting, at each said trace tool, information of an event on said associated communication path having at least one selected address;

storing said selected event information to a trace buffer at said trace tool, thereby conducting a trace;

repeating said detecting, selecting and storing steps;

responding to a trace stop command at one of said trace tools to stop said traces thereat;

said trace tool issuing a breakpoint signal to all said interconnected trace tools; and said interconnected trace tools responding to said provided breakpoint signal to stop said traces thereat, whereby said trace is saved at each said trace tool.

17. The method of claim 16, additionally comprising the initial step of programming a memory of at least one of said trace tools to comprise one or more wrapping trace buffers of variable length, wherein said step of storing said selected event information to said trace buffer comprises storing said selected event information to selected ones of said programmed wrapping trace buffers, so that newer said selected event information overwrites the oldest said selected event information in each said trace buffer.

18. The method of claim 17, additionally comprising the step of selecting information additionally comprises selecting the extent of each said selected event information for storing in said selected programmed wrapping trace buffer, and wherein said extent is a data length count.

19. The method of claim 16, additionally comprises the initial step of selectably causing said trace tool to issue said breakpoint signal.

20. The method of claim 16, wherein each said trace tool additionally comprises an elapse clock, and wherein said step of providing said selected information to said trace buffer additionally comprises time stamping each said selected event information with elapse clock timing of said elapse clock, and wherein said steps of responding to a received trace stop command and responding to a received breakpoint signal additionally comprise marking a time stamp of said elapse clock timing at the time of said received trace stop command/breakpoint signal, whereby the timing of each of said traces is determinable from the sequence of said time stamps.

21. The method of claim 16, wherein said computer system attachment network comprises a plurality of communication paths associated with a plurality of host computers, at least one said associated communication path of each said host coupled to one of said trace tools; wherein said trace stop command is provided on any of said associated communication paths addressed to one of said trace tools; and wherein said step of responding to said trace stop command comprises said addressed trace tool stopping the traces thereat and providing a breakpoint signal to all said interconnected trace tools.

* * * * *